(12) United States Patent
Gottumukkala et al.

(10) Patent No.: US 11,102,616 B2
(45) Date of Patent: Aug. 24, 2021

(54) METHOD OF TRACKING OBJECTS USING THERMOSTAT

(71) Applicant: Carrier Corporation, Palm Beach Gardens, FL (US)

(72) Inventors: Pradeep Kumar Gottumukkala, Telangana (IN); Ravi Kumar Kandhi, Telangana (IN); Srinivas Ramisetti, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/553,539

(22) Filed: Aug. 28, 2019

(65) Prior Publication Data

US 2020/0077233 A1 Mar. 5, 2020

(30) Foreign Application Priority Data

Aug. 31, 2018 (IN) .............................. 201811032807

(51) Int. Cl.
*H04W 4/029* (2018.01)
*H04W 4/80* (2018.01)
*G06F 3/0484* (2013.01)

(52) U.S. Cl.
CPC .......... *H04W 4/029* (2018.02); *G06F 3/0484* (2013.01); *H04W 4/80* (2018.02)

(58) Field of Classification Search
CPC ..... G01S 13/878; G01S 13/886; G05B 15/02; G05D 23/1902; G05D 23/306; G05F 1/66; G06F 3/0416; G06F 3/0481; G06F 3/0484; G06F 3/14; G06K 9/6217; G06Q 10/087; H04L 12/2803; H04L 43/10; H04M 1/72577; H04W 4/029; H04W 4/33; H04W 4/80; H04W 76/14
USPC ..................................................... 340/539.14
See application file for complete search history.

(56) References Cited

U.S. PATENT DOCUMENTS

| | | | |
|---|---|---|---|
| 6,344,794 B1 | 2/2002 | Ulrich et al. | |
| 9,353,965 B1* | 5/2016 | Goyal | ................. H04L 12/2823 |
| 9,622,208 B2 | 4/2017 | Mycek et al. | |
| 9,639,098 B2 | 5/2017 | Giorgi | |
| 9,788,167 B2 | 10/2017 | Geng et al. | |
| 9,980,082 B2 | 5/2018 | Nhu | |
| 2009/0070797 A1* | 3/2009 | Ramaswamy | ........ H04W 4/029 725/10 |
| 2009/0231136 A1 | 9/2009 | Sugla et al. | |
| 2014/0148196 A1 | 5/2014 | Bassan-Eskenazi et al. | |
| 2015/0213295 A1 | 7/2015 | Ginsburg et al. | |
| 2016/0025837 A1* | 1/2016 | Hillier | ................... H04W 4/023 342/386 |
| 2016/0028828 A1 | 1/2016 | Tadajewski et al. | |
| 2016/0110782 A1* | 4/2016 | Tadajewski | ........ G06Q 30/0601 705/14.37 |

(Continued)

*Primary Examiner* — Stephen R Burgdorf
(74) *Attorney, Agent, or Firm* — Cantor Colburn LLP

(57) ABSTRACT

Provided are techniques for tracking a tagged object using a thermostat. The techniques include utilizing a controller that includes a display, wherein the controller is located in a thermostat and is configured to receive a scan request. The techniques also include a tag that is coupled to an object, where the tag is configured to transmit a beacon, and one or more sensors are configured to detect the beacon and transmit data associated with the tag to the controller, wherein each of the one or more sensors are located in one or more zones of a structure.

15 Claims, 4 Drawing Sheets

(56) References Cited

U.S. PATENT DOCUMENTS

| | | |
|---|---|---|
| 2016/0165387 A1 | 6/2016 | Nhu |
| 2016/0165405 A1 | 6/2016 | Shinozuka et al. |
| 2016/0373893 A1 | 12/2016 | Khanna et al. |
| 2017/0053505 A1* | 2/2017 | Lauria .................. G06Q 10/087 |
| 2017/0122613 A1 | 5/2017 | Sinha et al. |
| 2017/0146260 A1* | 5/2017 | Ribbich ................... F24F 11/30 |
| 2017/0228935 A1* | 8/2017 | Foster ................... G06F 1/1694 |
| 2017/0323123 A1 | 11/2017 | Rabb et al. |
| 2017/0328997 A1* | 11/2017 | Silverstein .............. G01S 13/87 |
| 2018/0196972 A1 | 7/2018 | Lu et al. |
| 2018/0243568 A1* | 8/2018 | Demmer ............ A61N 1/37276 |
| 2018/0351762 A1* | 12/2018 | Iyengar ............... H04L 12/2827 |
| 2018/0359764 A1* | 12/2018 | Ong ...................... H04W 72/10 |
| 2019/0391227 A1* | 12/2019 | Zhang ................... G01S 5/0284 |
| 2020/0136678 A1* | 4/2020 | Shiobara .......... G06K 19/07773 |

* cited by examiner

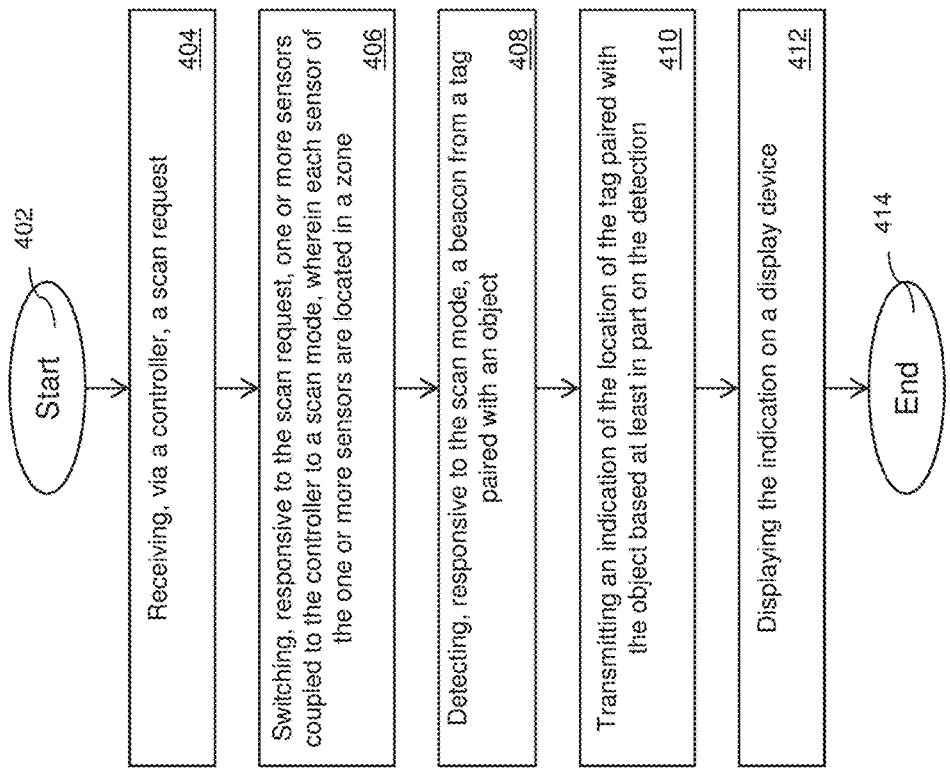

METHOD OF TRACKING OBJECTS USING THERMOSTAT

CROSS-REFERENCE TO RELATED APPLICATIONS

This application claims the benefit of Indian Application No. 201811032807 filed Aug. 31, 2018, which is incorporated herein by reference in its entirety.

BACKGROUND

The embodiments herein generally relate to sensors, and more specifically, to a method of tracking objects using a thermostat.

Thermostats are equipped with elaborate displays that are configured to present status information to a user. Such information can include time, date, current temperature, temperature setting, humidity information, etc. The thermostats can also include low-power LCD or LED displays and audio devices to provide audible notifications and alerts. In addition, the thermostats can be configured to communicate over wireless networks to provide a user the convenience to monitor and control their systems using remote applications on a computing device such as a mobile phone.

BRIEF SUMMARY

According to an embodiment, a system for tracking a tagged object using a thermostat is provided. The system including a controller including a display, wherein the controller is included in the thermostat and is configured to receive a scan request. The system also includes a tag coupled to an object, the tag configured to transmit a beacon, and one or more sensors configured to detect the beacon and transmit data associated with the tag to the controller, wherein each of the one or more sensors are located in one or more zones of a structure.

In addition to one or more of the features described herein, or as an alternative, further embodiments include a server that is operably coupled to the thermostat, the server configured to exchange data associated with the tag between the thermostat and one or more computing devices.

In addition to one or more of the features described herein, or as an alternative, further embodiments include using a tag ID and location information of the tag.

In addition to one or more of the features described herein, or as an alternative, further embodiments include one or more computing devices that are configured to transmit the scan request to the thermostat.

In addition to one or more of the features described herein, or as an alternative, further embodiments include a display that is configured to present a graphical representation of a location of at least one tag.

In addition to one or more of the features described herein, or as an alternative, further embodiments include a display that is configured to present a graphical representation of objects coupled to the at least one tag.

In addition to one or more of the features described herein, or as an alternative, further embodiments include the one or more sensors that are Bluetooth Low Energy sensors.

In addition to one or more of the features described herein, or as an alternative, further embodiments include a scan request that includes a request for a location of at least one tag.

In addition to one or more of the features described herein, or as an alternative, further embodiments include a scan request that includes at least one tag ID.

According to another embodiment, a method for tracking tagged objects using a thermostat is provided. The method further includes receiving, via a controller, a scan request, wherein the controller is comprised in a thermostat, and switching, responsive to the scan request, one or more sensors coupled to the controller to a scan mode, wherein each sensor of the one or more sensors are located in a zone. The method includes detecting a beacon from a tag paired with an object, wherein the tag is located in a zone, transmitting an indication of the location of the tag paired with the object based at least in part on the detection, and displaying the indication on a display device.

In addition to one or more of the features described herein, or as an alternative, further embodiments include an indication that is presented on a display of the thermostat.

In addition to one or more of the features described herein, or as an alternative, further embodiments include an indication that is provided as graphical representation of the location of the tag with the paired object.

In addition to one or more of the features described herein, or as an alternative, further embodiments include one or more sensors that are Bluetooth Low Energy sensors.

In addition to one or more of the features described herein, or as an alternative, further embodiments include a scan request that is input from at least one of a web client, mobile application, or the thermostat.

In addition to one or more of the features described herein, or as an alternative, further embodiments include a scan request that requests a location of at least one tag.

In addition to one or more of the features described herein, or as an alternative, further embodiments include responsive to the detection of the tag by multiple sensors in a plurality of zones, identifying a zone of the plurality of zones based at least in part on a signal strength.

In other embodiments, a thermostat includes an interface to communicate with one or more sensors, a display configured to display an indication on a display device, and a controller is provided. The thermostat is configured to receive a scan request, wherein the controller is comprised in a thermostat, and switch, responsive to the scan request, one or more sensors coupled to the controller to a scan mode, wherein each sensor of the one or more sensors are located in a zone. The thermostat is also configured detect a beacon from a tag paired with an object, wherein the tag is located in a zone, and transmit an indication of the location of the tag paired with the object based at least in part on the detection.

In addition to one or more of the features described herein, or as an alternative, further embodiments include an indication that is provided as graphical representation of the location of the tag with the paired object.

In addition to one or more of the features described herein, or as an alternative, further embodiments include a controller that is further configured to transmit data to a server, wherein the data comprises a tag ID and location information of the tag.

In addition to one or more of the features described herein, or as an alternative, further embodiments include a scan request that is input from at least one of a web client, mobile application, or the thermostat.

Technical effects of embodiments of the present disclosure include leveraging an existing network of sensors to perform tracking of tagged objects, where the results are graphically presented to a user on a device such as a thermostat display.

The foregoing features and elements may be combined in various combinations without exclusivity unless expressly indicated otherwise. These features and elements, as well as the operation thereof, will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 4 depicts a flowchart of a method for tracking objects using a thermostat in accordance with one or more embodiments.

DETAILED DESCRIPTION

In today's environment, thermostats have increased control capabilities beyond simply setting control temperatures for a particular zone of a given area. For example, thermostats are enabled to communicate with sensors and other computing devices over a wireless or wired connection. The sensors can be used to detect the temperature and/or humidity, and even further, the sensors are used to trigger a cooling/heating system to regulate the temperature of a zone. In addition, thermostats can be configured to communicate with a mobile device over a network, such as a Wi-Fi network, where the mobile device can be used to send commands to the thermostat or obtain readings from the thermostat when the user is away from home.

Oftentimes, users lose items and may have trouble locating their items in their homes. For example, users frequently misplace keys, phones, TV remote controllers, etc. In a scenario where a user loses an item, the user can waste large amounts of time looking for these items in places that are not even close to the item's last location.

The techniques described herein leverage existing sensors to track tags that have been paired and attached to various objects. For example, each tag has a tag ID and is registered with a thermostat along with paired objects. The sensors are located in various zones throughout the home or building and are configured to wirelessly detect a transmitted signal from the tags. The zone ID and the signal strength received from the sensor and tags can be used to identify the object and zone the tagged object is present.

Figure 1:
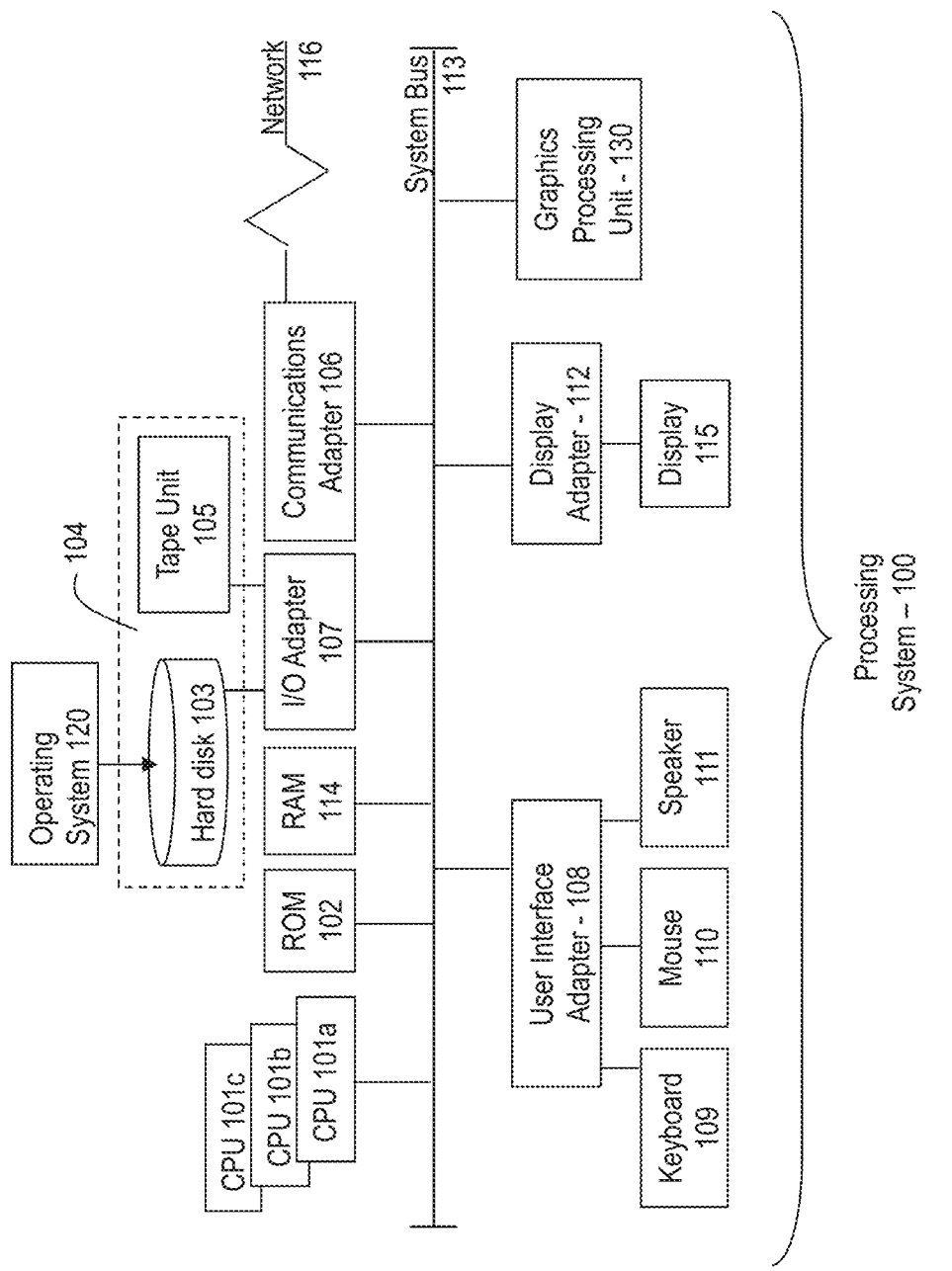
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
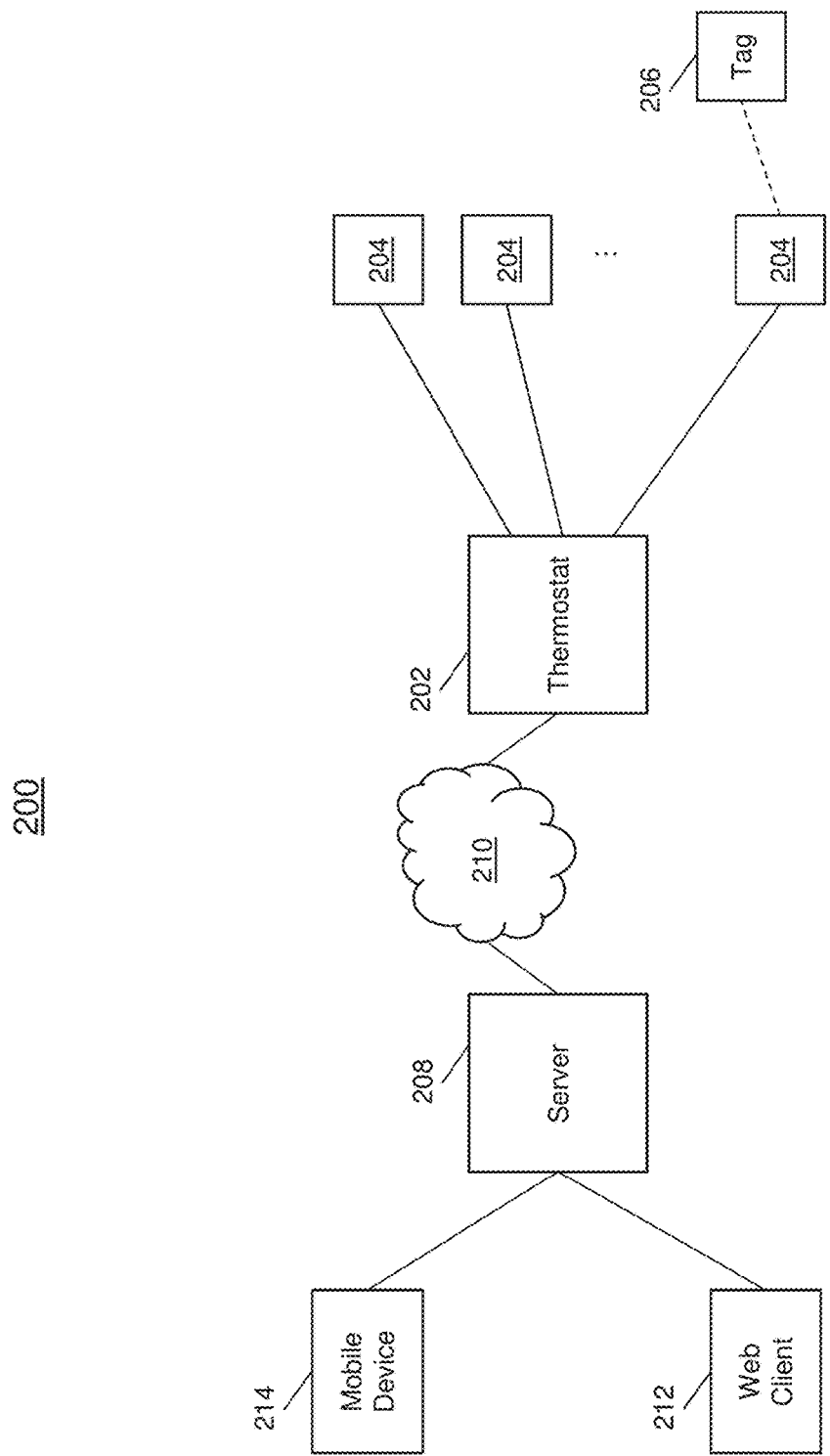
FIG. 2 depicts a system for tracking objects using a thermostat in accordance with one or more embodiments.

Now referring to FIG. 2, a system 200 for performing a method of tracking objects using a thermostat is shown. One or more elements of the system 200 can be implemented from the various components shown in FIG. 1. The system 200 includes a thermostat 202 that is operably connected to one or more sensors 204. The thermostat 202 is configured to communicate with the sensors 204 over a wired or wireless connection. The thermostat 202 can include a display such as that shown in FIG. 1. The thermostat 202 is configured to display information received from the sensors 204. The one or more sensors 204 can be positioned in different zones of a structure such as a home. For example, one or more sensors 204 can be located in a zone such as a living room of a home, master bedroom, kitchen, etc. In another embodiment, the zones can be defined as a particular area or space for conditioning air. Each defined zone is configured with an identifier that is used to label the respective zones, where the sensors 204 can monitor temperature and/or humidity of the respective zones and broadcasted to the thermostat.

In a non-limiting example, the sensors 204 are configured to detect beacons from one or more tags 206 using a wireless connection such as Bluetooth. In one or more embodiments, the communication is achieved using Bluetooth Low Energy (BLE) standard or another type of communication standard. The tags 206 are configured to transmit beacons at a configurable interval.

In one or more embodiments, the tags 206 are paired with objects during a registration or configuration phase. For example, a tag ID can be registered with the thermostat and the paired object can be identified with an icon or thumbnail type image. In another example, the tag can be registered with the thermostat using a mobile device such as a mobile phone or tablet or through some computing device.

Objects can include such objects as car keys, a pet (collar), phone, or any other item or device. The tags are physically attached to the objects and are configured to periodically transmit a beacon or signal at a configurable interval. In an embodiment, the tags paired with more important items such as keys can transmit the beacons at a higher frequency than tags that are paired with less important items. The period at which the beacons are transmitted can be configured based on a user's preference.

In the event multiple sensors 204 are located in a single zone, an accurate location within the zone for the detected tag 206 can be determined using techniques such as triangulation or other similar techniques. Also, in a scenario where a single tag 206 is detected by multiple sensors 204 in different zones, the signal strength of the detected beacons can be used to identify the zone the tag 206 is present in.

In one or more embodiments, additional information can be displayed on the thermostat 202 such as the signal strength of the tag, battery life of the tag, etc. The data can be presented on the display of a thermostat or other device as a textual or graphical representation. For example, the information can be indicated as a percentage or a graphical image.

After the thermostat 202 receives the data including the tag location information, it is transmitted to a cloud server 208 over a network 210. In a non-limiting example, the network 210 is a Wi-Fi network. The server 208 can be configured with the appropriate interfaces and can relay the information to a web client 212 or mobile device 214. The web client 212 and mobile device 214 are operably coupled to the thermostat and can textually or graphically display information related to a tag. In addition, the web client 212 and mobile device 214 can transmit requests to perform a search for a tag.

The request is received at the server 208 and transmitted to the thermostat 202 over the network 210. The thermostat 202 transmits a command to the coupled sensors 204 to switch the sensors 204 to a searching mode to detect the location of any tags 206. In another embodiment, the request can be input directly to the thermostat 202 on its interface. The request can be used to perform a search for a particular tag (using a tag ID) or perform a search for all tags that are registered to the thermostat 202. It is to be understood that other types of computing devices can be coupled to the system 200 to exchange data with the system 200 to detect the location of one or more tags 206.

Figure 3:
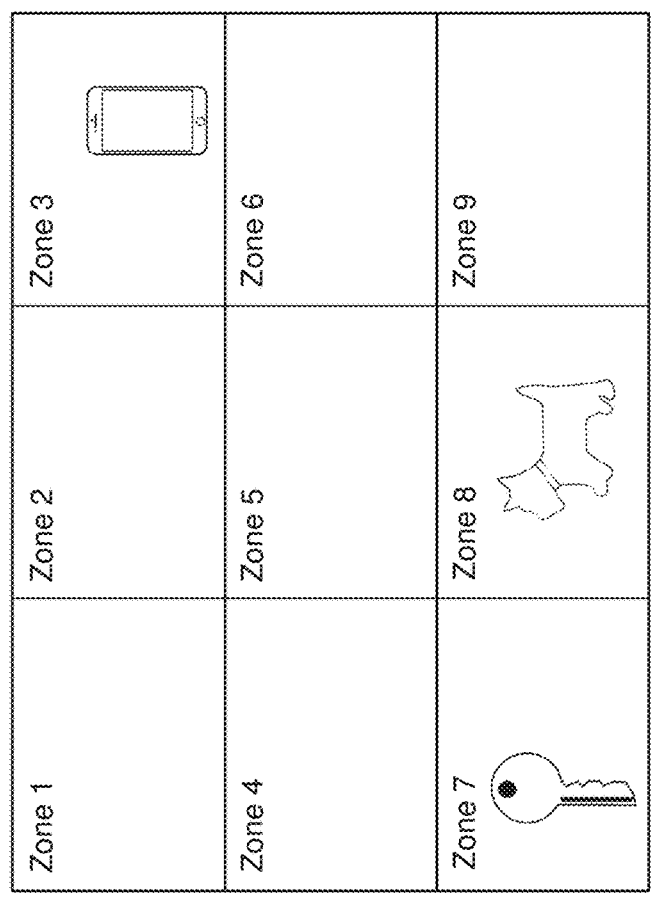
FIG. 3 depicts an example display of a thermostat in accordance with one or more embodiments.

Now referring to FIG. 3, an example display 300 of a thermostat is shown. As shown in the display 300, data indicating the zone and the detected object is provided. In this non-limiting example, there are 9 zones shown identified as Zone 1 through Zone 9 in different cells. The zones as shown in the display 300 are arranged sequentially, however, in other embodiments, the zones can be displayed in an arrangement that closely mimics the physical layout of each defined zone in the area. Also, different identifiers can be used such as a living room, master bedroom, basement, etc. and can be configured during a registration and/or installation phase.

Also shown on the display 300, is an icon or image representative of the object associated with the tag. The graphical representation of the object provides an intuitive presentation to the user of the location of the tagged object. As shown in the display 300 of FIG. 3, the mobile phone is located in Zone 3, the car keys are located in Zone 7, and the pet is located in Zone 8. It is to be understood that other information can be presented on the display of the thermostat 300 such as the temperature, humidity, battery life, etc. for each sensor in the zone.

In one or more embodiments, the information obtained from the sensors, tags, and thermostat can be transmitted to a cloud server and further provided to a web client, mobile application, or some other device. A similar graphical representation can be displayed on the display of a computing device.

In FIG. 4, a flowchart of a method 400 for tracking objects using a thermostat is shown. The method 400 can be implemented in a system, such as that shown in FIGS. 1 and 2. The method 400 begins in block 402 and proceeds to block 404, which provides for receiving, via a controller, a scan request. In one or more embodiments, the controller can be part of a thermostat. In addition, the scan request can be input directly on the thermostat or the scan request can be received from other devices. The scan request can include a tag ID to search for a specific tag or the scan request can be a general request to search for all tags in the area. The method 400 continues to block 406 which provides for switching, responsive to the scan request, one or more sensors coupled to the controller to a scan mode, wherein each sensor of the one or more sensors are located in a zone. The sensors are all switched to a scan mode to search for the one or more tagged objects. At block 408, the method 400 provides for detecting a beacon from a tag paired with an object, wherein the tag is located in a zone and proceeds to block 410 which provides for transmitting an indication of the location of the tag paired with the object based at least in part on the detection. In one or more embodiments, the indication includes the object/tag ID and a zone ID. At block 412, the indication is displayed on a display device such as on the thermostat or some other connected device. The method 400 ends at block 414 and can be repeated at a configurable interval or responsive to receiving a subsequent scan request.

The technical effects and benefits include utilizing existing Bluetooth wireless sensors in each zone in a home to track the objects using BLE tagging and displaying the tracked objects in a thermostat screen according to the zones. The low energy protocol extends the life of the tags allowing a user to conveniently and efficiently track their tagged items for a long time.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for tracking a tagged object using a thermostat, the system comprising:
   a controller comprising a display, wherein the controller is comprised in the thermostat and is configured to receive a scan request;
   a tag coupled to an object, the tag configured to transmit a beacon, wherein a tag paired with a high-priority object transmits beacons at a first frequency interval, wherein a tag paired with a low-priority object transmits beacons at a second frequency interval, wherein the first frequency interval is shorter than the second frequency interval;
   one or more sensors configured to detect the beacon and transmit data associated with the tag to the controller, wherein each of the one or more sensors are located in one or more zones of a structure; wherein the display is configured to present a graphical representation of a location of at least one tag, wherein the scan request includes at least one tag ID; and
   responsive to the detection of the tag by multiple sensors in a plurality of zones, identifying a zone of the plurality of zones based at least in part on a signal strength.

2. The system of claim 1, further comprising a server operably coupled to the thermostat, the server configured to exchange data associated with the tag between the thermostat and one or more computing devices.

3. The system of claim 2, wherein the data comprises a tag ID and location information of the tag.

4. The system of claim 3, wherein the one or more computing devices are configured to transmit the scan request to the thermostat.

5. The system of claim 1, wherein the display is configured to present a graphical representation of objects coupled to the at least one tag.

6. The system of claim 1, wherein the one or more sensors are Bluetooth Low Energy sensors.

7. The system of claim 1, wherein the scan request includes a request for a location of at least one tag.

8. A method for tracking tagged objects using a thermostat, the method comprising:
   receiving, via a controller, a scan request, wherein the controller is comprised in a thermostat;
   switching, responsive to the scan request, one or more sensors coupled to the controller to a scan mode, wherein each sensor of the one or more sensors are located in a zone;
   detecting a beacon from a tag paired with an object, wherein the tag is located in a zone, wherein beacons from a tag paired with a high-priority object are detected at a first frequency interval, wherein beacons from a tag paired with a low-priority object are detected at a second frequency interval, wherein the first frequency interval is shorter than the second frequency interval;
   transmitting an indication of the location of the tag paired with the object based at least in part on the detection;
   displaying the indication on a display device, wherein the indication is provided as a graphical representation of the location of the tag with the paired object, wherein the scan request includes at least one tag ID; and
   responsive to the detection of the tag by multiple sensors in a plurality of zones, identifying a zone of the plurality of zones based at least in part on a signal strength.

9. The method of claim 8, wherein the indication is presented on the display device of the thermostat.

10. The method of claim 8, wherein the one or more sensors are Bluetooth Low Energy sensors.

11. The method of claim 8, wherein the scan request is input from at least one of a web client, mobile application, or the thermostat.

12. The method of claim 8, wherein the scan request requests a location of at least one tag.

13. A thermostat comprising:
   an interface to communicate with one or more sensors;
   a display configured to display an indication on a display device; and
   a controller configured to:
      receive a scan request, wherein the controller is comprised in a thermostat;
      switch, responsive to the scan request, one or more sensors coupled to the controller to a scan mode, wherein each sensor of the one or more sensors are located in a zone;

detect a beacon from a tag paired with an object, wherein the tag is located in a zone, wherein beacons from a tag paired with a high-priority object are detected at a first frequency interval, wherein beacons from a tag paired with a low-priority object are detected at a second frequency interval, wherein the first frequency interval is shorter than the second frequency interval;

transmit an indication of the location of the tag paired with the object based at least in part on the detection, wherein the indication is provided as a graphical representation of the location of the tag with the paired object, wherein the scan request includes at least one tag ID; and responsive to the detection of the tag by multiple sensors in a plurality of zones, identify a zone of the plurality of zones based at least in part on a signal strength.

14. The thermostat of claim 13, wherein the controller is further configured to transmit data to a server, wherein the data comprises a tag ID and location information of the tag.

15. The thermostat of claim 13, wherein the scan request is input from at least one of a web client, mobile application, or the thermostat.

* * * * *